United States Patent [19]

Spicer

[11] 4,259,359
[45] Mar. 31, 1981

[54] HIGH PROTEIN WHEAT PRODUCT

[75] Inventor: Arnold Spicer, Santa Ponsa, Spain

[73] Assignee: New Generation Foods, Inc., Reno, Nev.

[21] Appl. No.: 956,661

[22] Filed: Nov. 6, 1978

Related U.S. Application Data

[63] Continuation-in-part of Ser. No. 852,288, Nov. 17, 1977, abandoned.

[51] Int. Cl.³ .............................................. A21D 2/14
[52] U.S. Cl. .................................... 426/62; 426/19; 426/98; 426/442; 426/446; 426/511; 426/559; 426/625; 426/808
[58] Field of Search ...................... 426/19, 20, 21, 62, 426/94, 98, 302, 307, 549, 559, 560, 621, 625, 808, 442, 445–450, 455–458, 511

[56] References Cited

U.S. PATENT DOCUMENTS

| | | | |
|---|---|---|---|
| 2,701,200 | 2/1955 | Huber | 426/559 |
| 3,259,503 | 7/1966 | Tan et al. | 426/559 |
| 3,656,966 | 4/1972 | Ball | 426/559 |
| 3,682,652 | 8/1972 | Corbin et al. | 426/302 |
| 3,703,379 | 12/1972 | Cummisford | 426/559 |
| 3,753,729 | 8/1973 | Harms | 426/559 |
| 3,868,471 | 2/1975 | Decelles et al. | 426/307 |

*Primary Examiner*—Raymond N. Jones
*Assistant Examiner*—Elizabeth A. Hatcher
*Attorney, Agent, or Firm*—Fitch, Even, Tabin, Flannery & Welsh

[57] ABSTRACT

A high protein, whole wheat grain expanded food product is prepared by the process of the present invention. Ground whole wheat is mixed with moisture and an edible acid to provide a dough. The dough is then extruded through a die under particular conditions to provide a high protein, expanded wheat product.

21 Claims, No Drawings

HIGH PROTEIN WHEAT PRODUCT

The present application is a Continuation-In-Part of Application Ser. No. 852,288, filed Nov. 17, 1977 now abandoned.

The present invention relates generally to high-protein wheat products and to a method for preparing such products. More particularly, the present invention relates to an expanded, edible product prepared from high protein wheat which, in a preferred embodiment, is in the form of a curl.

There are, of course, many products available in the food industry which have an expanded structure and many processes have been devised to expand various food materials, particularly corn and rice, to provide several classes of food products, such as cereals and snacks. The most common method for preparing expanded snack products is to extrude a moisture containing dough of a starchy material under pressure from a heated extruder. High pressure expansion of gas within the dough as it exits from the extruder from a zone of high pressure to a zone of low pressure results in the formation of an expanded food product. The retention of the expanded structure by the food product after emergence from the extruder is usually provided by dough compositions having a high starch content. It has not been generally thought possible to provide an expanded food product from dough compositions having a relatively high wheat protein content. High wheat protein levels result in providing doughs with high elastic rebound and the dough after emergence from the extruder and expansion, tends to revert to an unexpanded dense structure.

It has been particularly difficult to effect expansion and desired texturization of doughs prepared from wheat products having a high protein content. Attempts to produce expanded high protein wheat products have generally resulted in products which are tough in texture and unable to hold the expansion upon extrusion of the product.

Various attempts have been made to expand or puff doughs prepared from high protein content wheat products so as to provide a light, crisp and tender texture. In this connection, various expansion aids, such as starch and leavening agents have been added to the dough prior to expansion. U.S. Pat. No. 3,851,081 to Edward Epstein discloses the addition of a protein gel to effect desired expansion of various grain products upon extrusion. However, the previous known attempts to provide an expanded food product from high protein content wheat products have not been successful in achieving the desired expansion, crispness, tenderness, and mouth feel usually associated with commercially accepted expanded food products, such as "corn curls".

For purposes of the present specification, the term "high protein content wheat product" is meant to include a ground product derived from whole wheat grain containing at least 11 percent by weight of protein. It should be understood that reference to the protein content of the wheat is meant the protein content of the whole wheat grain and not to the protein content of flour derived from the endosperm of wheat grain from which the bran and germ have been removed. In the manufacture of wheat flour, the aim is separation of the endosperm of the grain from the bran and germ, followed by pulverizing it to very small particles. The pulverized endosperm is the product generally regarded as flour. The various steps involved in wheat flour production are wheat selection and blending, cleaning, conditioning or tempering, breaking, bolting or sieving, purification, reduction, and bleaching.

The composition of various cereal grains is set forth hereinbelow in Table I.

TABLE I

Average Proximate Composition of Cereal Grains and Buckwheat[a]

| Grain | Protein, % | Fat, % | Fiber, % | Nitrogen-free extract % | Ash % |
|---|---|---|---|---|---|
| Barley (excluding Pacific Coast States) | 12.7 | 1.9 | 5.4 | 66.6 | 2.8 |
| Barley (Pacific Coast States) | 8.7 | 1.9 | 5.7 | 70.9 | 2.6 |
| Barley, lightweight | 12.1 | 2.1 | 7.4 | 64.3 | 3.2 |
| Buckwheat, ordinary varieties | 10.3 | 2.3 | 10.7 | 62.8 | 1.9 |
| Corn, dent, Grade No. 1 | 8.8 | 4.0 | 2.1 | 70.9 | 1.2 |
| Corn, dent, Grade No. 2 | 8.6 | 3.9 | 2.0 | 69.3 | 1.2 |
| Corn, dent, Grade No. 3 | 8.4 | 3.8 | 2.0 | 68.1 | 1.2 |
| Corn, dent, Grade No. 4 | 8.2 | 3.7 | 1.9 | 66.2 | 1.1 |
| Corn, flint | 9.8 | 4.3 | 1.9 | 71.0 | 1.5 |
| Corn, pop | 11.5 | 5.0 | 1.9 | 70.1 | 1.5 |
| Corn, sweet, mature | 11.5 | 7.9 | 2.4 | 67.1 | 1.8 |
| Oats (excluding Pacific Coast States) | 12.0 | 4.6 | 11.0 | 58.6 | 4.0 |
| Oats (Pacific Coast States) | 9.0 | 5.6 | 11.0 | 62.1 | 3.7 |
| Rice, rough[b] | 7.9 | 1.8 | 9.0 | 64.9 | 5.2 |
| Rice, brown[c] | 9.1 | 2.0 | 1.1 | 74.5 | 1.1 |
| Rye | 12.6 | 1.7 | 2.4 | 70.9 | 1.9 |
| Wheat, hard spring (chiefly Northern Plains States) | 15.8 | 2.2 | 2.5 | 67.8 | 1.8 |
| Wheat, hard winter (chiefly Southern Plains States) | 13.5 | 1.8 | 2.8 | 69.2 | 2.1 |
| Wheat, soft winter (Mississippi Valley and eastward) | 10.2 | 1.9 | 2.1 | 73.2 | 1.8 |
| Wheat, soft (Pacific Coast States) | 9.9 | 2.0 | 2.7 | 72.6 | 1.9 |

[a]The moisture content of the different grains is variable and the moisture basis on which the analyses are expressed may be computed by subtracting the sum of the analytical values from 100.0.
[b]Rough rice comprises the entire grain including the hulls.
[c]Brown rice consists of grain from which the hulls have been removed.

Most expanded snack products produced heretofore have been manufactured from either corn or rice. It is apparent from the foregoing Table I that corn (except for pop corn and sweet corn, neither of which is used in expanded snack manufacture) and rice are both relatively low in protein (less than about 9 percent). Corn and rice also have a more extensible protein which is more amenable to production of expanded snack products.

Accordingly, it is a principal object of the present invention to provide an expanded food product from high protein content wheat which is tender, crisp, and of relatively low density.

It is another object of the invention to provide a high protein content wheat product and a method for the preparation thereof which is in an edible form and which is expanded to a low density.

It is a still further object of the invention to provide a high protein content, expanded wheat product which is in a unique, curled condition.

Generally, the process of the present invention contemplates providing a high protein, whole wheat grain and grinding it to a desired degree. The ground whole wheat is mixed with moisture and an edible acid to provide a dough. It is also preferable to add an extrusion aid or lubricant to the dough to reduce the extrusion pressures required. The preferred extrusion aid is an edible oil or fat which is added in a controlled amount to effect lubrication during extrusion and to provide the desired texture for the product. The moisture is added in sufficient quantity to provide a doughlike consistency. The dough is then extruded through a die under particular conditions to provide the high protein, expanded wheat product of the invention.

The endosperm proteins of wheat, called gluten, possess the peculiar and distinctive property of forming a visco elastic gel when wetted with water and worked for a period of time. In the process of the present invention, there is a very short working period of less than about 40 seconds and there is not sufficient time to develop extensibility. The presence of the edible acid is believed to provide an environment in which extensibility is developed while working the dough over a short period of time of less than about 40 seconds.

The edible acid is present at a level of from about 0.01 to about 0.05 percent equivalent lactic acid based upon the weight of wheat. Preferably the edible acid is present at a level of from about 0.02 to about 0.04 percent by weight equivalent lactic acid. All percentages used herein are by weight unless otherwise specifically indicated.

By the term "equivalent lactic acid" is meant that amount of a given edible acid which has the same acidifying equivalent as the specified amount of lactic acid. Suitable edible acids include, but are not limited to, lactic acid, phosphoric acid, hydrochloric acid, gluconic acid, acetic acid, succinic acid, adipic acid, fumaric acid, malic acid, citric acid, tartaric acid and mixtures thereof. At levels of acid below the indicated range a tough, less expanded product is obtained which has an undesirable surface appearance. At higher levels of acid than the indicated range, the extrusion is erratic and an uneven product is obtained.

The edible acid may be provided by direct addition of a food grade chemical acid. Alternatively, the edible acid may be supplied by use of an acid containing food product. Suitable acid containing food products include, but are not limited to cream cheese, cottage cheese, yogurt, whey, dried whey solids, acidic fruit juices such as orange juice, lemon juice, grapefruit juice, and pineapple juice and mixtures thereof.

Common salt, NaCl, and other salts, such as sodium dihydrogen phosphate and other phosphate salts may be present in the dough. When used, the salt is present at a level of from about 1.5 to 6 percent by weight of the dough. It is preferred, however, not to add salt to the dough other than the salts contributed by optional ingredients, such as whey.

It is preferred that any dry ingredients which are used be uniformly distributed throughout the wheat material prior to addition of moisture and fat. The presence of moisture during the addition of the dry ingredients results in localized high concentrations of the dry ingredients which is undesirable.

The high protein wheat product of the present invention should have at least 11 percent protein. Various grades of wheat can be mixed to provide a wheat material having the desired 11 percent protein. In this connection, at least 7 classes of wheat are recognized and these various classes of wheat can be mixed to provide a wheat material having at least 11 percent protein. In an average year, the median protein content of hard-wheat produced in different areas will range from 11 to 15 percent. Soft-wheat will generally average from about 6 to about 11 percent protein. Soft and hard wheats can be mixed to provide the desired 11 percent protein wheat material. Also, a wheat material can be fortified with gluten or other protein to achieve the desired protein level.

It is recognized that the age, harvest time, geographical location of harvest and type of wheat will vary and that the quality of the wheat is dependent upon these factors. However, the principal requirement for the wheat material of the present invention of having at least 11 percent protein is dominant and the other factors may be varied within the skill of the art to adjust the conditions of treatment to accommodate these variations in the wheat material.

The wheat can be fortified with other protein materials such as albumen, yeast, isolated soy protein, casein, wheat germ, bran, and cracked wheat to increase the protein level of the product above that provided by the wheat alone. However, it should be understood that the added protein is not necessary to provide the body and texture of the expanded product of the invention, but is present for nutritional reasons. The added protein materials, when used, are present at a level of from about 5 to about 20 percent based on the weight of the wheat.

As indicated, an extrusion aid or lubricant is preferably present in the dough. Suitable extrusion aids include, but are not limited to, edible fats and oils, polyhydric alcohols, such as glycerin and propylene glycol, and mono-diesters of polyhydric alcohols and fatty acids, such as glycerol monostearate, glycerol monooleate, propylene glycol monostearate, propylene glycol distearate and propylene glycol monooleate.

The presence of the extrusion aid is an important requirement in order to properly prepare the dough which is to be expanded. The extrusion aid is present in a small but important proportion of from about 0.04 percent to about 3.0 percent, based upon the weight of the wheat. This level refers to the presence of the extrusion aid in addition to the fat normally provided by the wheat material. It is preferred that the extrusion aid be present between about 0.05 percent and about 1.0 percent. The presence of extrusion aid is desirable to effect the desired extrusion of the product. In the event that the level of extrusion aid is below the indicated range, the power requirements for extrusion and the ability to extrude at all are effected. Levels of extrusion aid above the indicated range prevent the desired expansion of the product after exiting from the extrusion die and may result in syneresis during extrusion.

The preferred extrusion aid is a triglyceride fat. The fat can be any of the various liquid and solid fats normally used in food manufacture. The fat can also be provided by a fat containing material or other additive, such as yogurt, milk or cream. In a preferred embodiment, yogurt, containing some fat and acid, is added to the dough to provide moisture, fat and acid as well as additional nutrition to the system. Flavoring and coloring ingredients can be added to provide desired taste and appearance to the final product. When using yogurt to provide its edible acid, the available edible acid during the time required to prepare and extrude the dough is less than the total acid of the yogurt. When using yogurt, the total available lactic acid provided by the yogurt can be up to three times the specified maximum of 0.05 percent. Yogurt can be used at a level of from about 7 to about 15 percent by weight, based on the weight of the wheat.

As indicated, the process of the present invention begins with whole wheat or a mixture of various types of whole wheat having a protein content of at least 11 percent. The whole wheat must be ground to a predetermined particle size to provide a suitable substrate which is susceptible to expansion by the process of the invention. In this connection, the maximum particle size of the ground whole wheat must be less than the minimum dimension of the aperture through which the dough is extruded to provide the expanded wheat product of the invention. Various shapes of apertures may be used, such as slots, circular or oblong holes, crescents, stars, etc. As discussed more fully hereinafter, however, it has been determined that a die having a slot as the extrusion aperture is most suitable in the preparation of the product of the invention. It has further been determined that the slot should have a width in the range of from about 0.020 inch to about 0.035 inch to provide an expanded wheat product material with a suitable density and the slot can have a length of from about 0.5 to about 3 inches.

Accordingly, the maximum particle size of the ground wheat material for a slot aperture should be no greater than about 0.035 inch. This corresponds approximately to a requirement that all of the ground wheat material pass through a #20 mesh screen, United States standard sieve size. The openings in a #20 mesh screen are 0.0328 inches. It has been determined, however, that up to about 0.5 percent of the ground wheat particles can be greater than #20 mesh screen, but no particle can be greater than about 0.040 inch. The particle size distribution of the ground wheat material is not critical so long as the maximum particle size is not exceeded. The whole wheat is preferably ground in a pulverizing type grinder, such as a hammermill provided with a screening device so that the maximum particle size is controlled during the grind operation.

The ground whole wheat is than mixed with any dry ingredients which are to be used. Simple blending in a ribbon blender or other type dry blending device is suitable for dispersing the dry ingredients in the ground wheat material.

A dough is then prepared by mixing the blend of ground wheat and other dry ingredients with water or a moisture containing product. The moisture or moisture containing ingredient is added at a level sufficient to provide a dough containing about 10 percent to about 30 percent by weight of water in addition to the equilibrium moisture provided by the ground wheat material and other dry ingredients. After the dough is prepared, an extrusion aid is added to the dough at the previously indicated levels. Various protein materials, flavoring, coloring and/or nutritional ingredients can be present in the dough for purposes of achieving a desired end product.

The dough is then introduced into an extruder or other suitable apparatus which is capable of working and heating the dough and extruding it through a nozzle or die. In this connection, the extruder should have a body section for high shear mixing or working of the dough while heating the dough to a temperature in the range of from about 100° F. to about 150° F. for a period of from about 5 to about 40 seconds. The extruder should have another head section just prior to the die in which the dough can be subjected to high temperature-short time heat treatment under conditions of high turbulence. In this connection, high temperature-short time heat treatment refers to heating conditions wherein the temperature of the dough is raised to a temperature in the range of from about 245° F. to about 370° F. during a period of less than about 1 second. It is important that the heating to a high temperature be limited to avoid protein denaturation and the initiation of browning due to a Mallard reaction.

The preferred heat conditions in the extruder are from about 105° F. to about 120° F. in the body section and from about 330° F. to about 360° F. in the head section. At these preferred heating conditions, the preferred acidity level range of from about 0.02 to about 0.04 percent equivalent lactic acid are required to achieve an effective extrusion. To achieve an effective extrusion at an acidity level outside the preferred range but within the effective range of from about 0.01 to about 0.05 percent equivalent lactic acid the heating conditions in the body section and the head section are adjusted to provide a desired product.

To achieve the high temperature-short time heating of the dough, live steam is introduced into the heating section at the rate of from between about 5 and about 15 pounds of process steam per hour per about 300 to about 1,000 pounds of dough per hour. The moisture added by the steam is negligible and is lost by flashing of steam from the dough exiting from the extruder. One suitable apparatus is the extrusion cooker manufactured by Wenger Manufacturing Company of Sabetha, Kansas.

The Wenger extrusion cooker is provided with a two die arrangement. The two dies are spaced from each other at the exit of the extruder by a distance of from about 0.05 to about 0.10 inches. The first die through which the dough is passed has one or more round holes located in the die. The second die spaced from the first die has an aperture shaped in accordance with the shape of the product which it is desired to extrude.

Heretofore, the usual practice has been to locate the aperture of the first die in alignment with the aperture of the second die. In accordance with the present invention it has been determined that location of the second die offset from the longitudinal axis of the first die results in a desired amount of turbulence in the section between the two dies. It is in this section between the two dies that the steam is introduced to heat the dough under high temperature-short time conditions. The added turbulence during heating of the dough is desirable to prevent localized over-heating and resultant denaturation of the protein during the high temperature-short time heating step.

The second die providing shape to the product comprises a generally circular plate having a rectangular slot or other shape formed therein. The slot is spaced from a line proceeding axially through the aperture of the first die. Thus, the product extrudes from an off-center location and may curl as it exits from the die. The product is cut at a desired length to provide the expanded product.

It has been determined that the width of the slot is important in respect to the density of the expanded wheat product. With slots having a maximum width of from about 0.020 inch to about 0.035 inch an expanded product having a desired density of from about 3.5 pounds to about 4.75 pounds per cubic foot is obtained. If the maximum die dimension exceeds about 0.035 inch, a product having a higher density is obtained. While such products can be utilized they are a less expanded product and have a cookie-like texture. As previously indicated, the maximum particle size of at least 99.5 percent of the ground wheat product should be less than the minimum dimension of the die.

The product picks up steam in high temperature-short time heating section as above-indicated and when extruded it drops this moisture with evaporation of steam and expansion of the product.

The dough should be at a pressure in the range of from about 600 to about 900 psig prior to exiting from the second die. Extrusion rates are dependent upon the size of the extruder.

After the product is extruded from the die and cut into pieces, the product is dried to a moisture level of less than about 5 percent, preferably to a moisture level of from about 1 to about 4 percent. Drying is effected at such a rate as to avoid case hardening of the product and, in general, is accomplished in a period of from about 3 to about 15 minutes.

After drying, the expanded wheat product has the following composition on a dry basis: ground wheat, 75 to 97 percent; edible acid 0.01 to 0.05 percent equivalent lactic acid based on the weight of the wheat fat, 0.04 to 3 percent based on the weight of the wheat and other ingredients, 0 to 25 percent based on the weight of the wheat.

The product can be eaten in this condition, but it is preferably coated with a flavor containing fat to give added flavor and eating characteristics. In this connection, it has been determined that a two-step process is desirable to retain the expanded structure and to provide desirable mouth feel and eating properties for the expanded wheat product. In the first step, the dried expanded wheat product is pre-coated by spraying with a liquid vegetable oil, preferably a high stability oil, such as Durkex 500, manufactured by Durkee Industrial Foods. High stability oil is a refined vegetable oil which contains no lauric acid. High stability oil has an iodine value of about 74-81 and has an SFI at 70° F. of 3.0 percent solids (Max). The pre-coating of the dry, expanded wheat product results in sealing the porous structure of the product and preventing collapse of the expanded structure. The pre-coating liquid oil is applied at a level of from about 1.5 to about 5 percent based on the weight of the expanded wheat product. Thereafter, a mixture of from about 30 to about 70 percent of a solid fat and from about 70 percent of a liquid vegetable oil containing flavoring ingredients is applied to the pre-coated expanded wheat product by spraying or other means. The solid fat is preferably a hydrogenated vegetable fat, such as hydrogenated coconut oil, having an iodine value of about 58-63 and an SFI at 70° F. of about 63 percent solids.

The solid fat is first melted and combined with the liquid oil. Desired flavoring components, such as salt, are mixed with the mixture of solid fat and liquid oil and the mixture containing the flavoring ingredient is applied to the pre-coated expanded wheat product. The flavor containing fat mixture is applied at a level of from about 10 to about 35 percent. The two-step coating process results in providing highly desirable flavor release properties and also results in retention of the desired expanded structure.

The following examples further illustrate various features of the invention, but is intended to in no way limit the scope of the invention which is defined in the appended claims.

EXAMPLE I

A hard winter wheat is ground in a hammermill using a 1/20 screen. The ground wheat product from the hammermill had the following sieve analysis (United States Standard sieve size):

| Sieve Size | Percent |
| --- | --- |
| Through 40 | 85.7 |
| On 40 | 14.3 |
| On 30 | 3.2 |
| On 20 | .3 |

Ninety (90) pounds of the ground wheat was introduced into a blender. Ten pounds of yogurt and 0.25 pounds of corn oil were added and dispersed in the ground wheat to provide a dough. The following flavoring and coloring ingredients were then blended into the dough: 0.5 pound artificial beef falvor, 0.03 pound caramel flavor, 0.02 pound yellow number 5 dye, 0.06 pound onion powder and 0.01 pound garlic powder. The acid level of the dough was 3.9 percent equivalent lactic acid.

The dough was introduced into a model X-20 Wenger extruder, manufactured by Wenger Manufacturing of Sabetha, Kansas. The barrel of the extruder had a diameter of 3.25 inches and had a length of 29.7 inches. The dough was passed through the barrel of the extruder at a rate of 300 pounds per hour.

At the end of the barrel was a conical nozzle having a diameter of 3.25 inches at its receiving end and a diameter of 2.46 inches at its discharge end, the length of the nozzle being 4.5 inches. At the outlet end of the nozzle two dies were located, spaced apart a distance of 0.085 inch. The first die along the direction of travel of the dough had a circular hole 0.25 inches in diameter located at the center of the die. The second die had a slot 1/16 inch in height and 1⅜ inches in length. The slot having a 30° taper from the backside and the die being 0.41 inch in thickness. The slot was disposed off-center in the die a distance of 0.95 inches from the center. The clearance between the two die plates was 0.077 inches.

During travel through the barrel, the dough was heated to a temperature of about 115° F. and the residence time in the barrel was 11 seconds.

During passage of the dough between the first die and the second die, steam was injected into the dough at a rate sufficient to heat the dough to a temperature of 255° F. while in the section between the two dies. The residence time of the dough in the section between the two dies while the dough was being heated to a temperature of 255° F. was less than one second.

The product curled as it exited from the die and was cut to form a curled wheat product. The moisture of the expanded wheat product leaving the extruder was about 18 percent. The product was introduced into a dryer and was dried to a moisture of 2 percent in about 10 minutes. The density of the dried product was 4 pounds per cubic foot.

After the product was dried, the product was sprayed with a high stability liquid vegetable oil (Durkex 500) at a level of 5 percent by weight of the product. The product was allowed to set for a period of 3 minutes and was then sprayed with a flavor carrying oil. The flavor carrying oil was a mixture of 50 percent high stability liquid vegetable oil (Durkex 500) and 50 percent hydrogenated coconut oil (Kaomel Confectioner's Coating Butter—manufactured by Durkee Industrial Foods). The hydrogenated coconut oil was heated to a temperature of 110° F. to melt the oil and was mixed with the liquid vegetable oil. Cheese powder was then added to the heated oil to provide a cheese flavored fat combination containing fifty percent cheese powder. The cheese flavored fat combination was applied to the pre-coated, expanded wheat product at a level of 15 percent to provide a flavored, highly nutritious expanded wheat product.

EXAMPLE II

An expanded wheat product was prepared in accordance with the procedure of Example I using an extrusion cooker designated Model X-25 by Wenger Manufacturing. The dough was passed through the barrel of the extruder at the rate of 800 pounds per hour. The first die along the direction of travel of the dough had 4 circular holes, each being 0.25 inch in diameter, located 90° apart and spaced 0.5 inch from the outer periphery of the die. The second die had 4 slots, each being 1/16 inch in height and 1⅜ inches in length. The slots were located 90° apart and were spaced 0.5 inch from the periphery of the die. The second die was positioned so that each slot was circumferentially spaced 45° from each hole.

Other conditions of heating and extrusion were the same as for Example I. A curled product was obtained from each slot that resembled the curled product produced in accordance with Example I.

EXAMPLE III

The procedure and extrusion cooker of Example I was used to produce an expanded wheat product. The formulation was the same as for Example I except that no yogurt was used. The moisture and acid contributed by the yogurt was added by dissolving 0.39 lbs. of lactic acid in 10 lbs. of water. The corn oil level was increased to 0.5 percent and ten pounds of water were added. The expanded wheat product obtained was similar to that of Example I in texture and appearance.

EXAMPLE IV

The procedure and apparatus of Example I was used to provide an expanded wheat product. The formulation was the same as for Example I except that sodium chloride was present in the formulation at a level of 2.5 pounds. The extrusion was successful and an expanded, curled wheat product was obtained similar to that of Example I.

EXAMPLE V

A mixture of soft and hard wheat was used to prepare an expanded wheat product in accordance with the procedure of Example I. Forty-five (45) pounds of hard winter wheat having a protein content of 15 percent was blended with forty-five (45) pounds of soft wheat having a protein content of 8 percent. The resultant blend was ground by the procedure of Example I and the process of Example I was used to provide an expanded, curled wheat product that was identical to that produced by Example I.

EXAMPLE VI

Four hundred forty-two (442) pounds of ground hard winter wheat having a protein content of about 13 percent was introduced into a blender. Thereafter, 44 pounds of inactive dried yeast was added and blended for about 15 minutes. Forty-four (44) pounds of yogurt, 2 pounds 3 ounces of corn oil and 17 pounds of water were mixed into the dough. The resulting liquid mixture was added to the dry mixture to form a dough which was mixed for about 15 minutes.

The dough was introduced into a Wenger extruder with three sets of circular dies arranged to produce hollow breadsticks.

During a travel through the barrel, the dough was heated to a temperature of about 105° F.

During passage of the dough between the first die and the second die of each set, steam was injected into the dough at a rate sufficient to raise the dough to a temperature of 350° F. while in the section between the two dies.

The exiting tubular product was cut into sticks which were retained in a dryer at about 250° F. for about 2.6 minutes.

After the product was dried, it was tumbled and sprayed, exhibiting essentially no breakage. The product had a density of about 3.9 pounds per cubic foot and had excellent texture.

I claim:

1. A method for preparing an expanded food product comprising grinding whole wheat having at least 11 percent protein, on a dry basis, to provide a ground whole wheat material, forming a dough from said ground wheat material, said dough having an edible acid present at a level of from about 0.01 to about 0.05 percent by weight equivalent lactic acid, working said dough while heating said dough, subjecting said heated dough to high temperature-short time heating conditions in a high pressure zone said acid and said working providing extensibility to said protein, extruding said heated dough from said high pressure zone to a low pressure zone, thereby effecting expansion of said dough, and drying said expanded dough to provide an expanded food product of desired moisture.

2. A method in accordance with claim 1 wherein said edible acid is present at a level of from about 0.02 to about 0.04 percent by weight equivalent lactic acid.

3. A method in accordance with claim 1 wherein said double acid is lactic acid.

4. A method in accordance with claim 1 wherein said expanded food product has a density of from about 3.5 to about 4.75 pounds per cubic foot.

5. A method in accordance with claim 4, wherein said high temperature-short time heat treatment is effected by injecting steam into said extruder in a zone between a first die and a second die, said first die having a round aperture through which said dough enters said chamber and said second die having a slot off-set from said aperture whereby said expanded dough exits from said extruder.

6. A method in accordance with claim 5 wherein said first die is provided with two or more apertures and said second die is provided with two or more slots, each of said slots being off-set from each of said apertures.

7. A method in accordance with claim 5 wherein said first die is spaced from said second die by from about 0.05 to about 0.10 inch.

8. A method in accordance with claim 1 wherein said ground wheat has a maximum size of 0.040 inch.

9. A method in accordance with claim 1 wherein said ground wheat is present in said dough at a level of from about 75 to about 97 percent, dry basis, said extrusion aid is present in an dough at a level of from about 0.04 to about 3 percent, based on the weight of said wheat, said edible acid is present in said dough at a level of from about 0.02 to about 0.04 percent, based on the weight of said wheat, and said dough having a moisture content of from about 15 to about 30 percent.

10. A method in accordance with claim 1 wherein said dough is introduced into an extruder to effect said working and said heating of said dough.

11. A method in accordance with claim 10 wherein said dough is worked and heated in a first section of said extruder to a temperature of from about 100° F. to about 150° F. for a period of from about 5 to about 40 seconds and said dough is subjected to high temperature-short time heating conditions in a second section of said extruder for a period of less than about 1 second, the temperature of said dough being increased to from about 245° F. to about 370° F. during said high temperature-short time heating.

12. A method in accordance with claim 10 wherein said dough is extruded from said extruder through a die having at least one slot.

13. A method in accordance with claim 12 wherein said slot has a width of from about 0.020 inch to about 0.035 inch and has a length of from about 0.5 inches to about 3 inches.

14. A method in accordance with claim 11 wherein said edible acid is provided by yogurt.

15. A method in accordance with claim 1 wherein said edible acid is provided by whey.

16. A method in accordance with claim 1 wherein said dough further comprises a protein material.

17. A method in accordance with claim 16 wherein said protein material is present at a level of from about 5 to about 20 percent by weight of said wheat.

18. A method in accordance with claim 16 wherein said protein material is yeast.

19. A method in accordance with claim 1 including the step adding an extrusion aid to said dough.

20. The expanded food product made by the method set forth in claim 1.

21. The expanded food product made by the method set forth in claim 9.

* * * * *

UNITED STATES PATENT AND TRADEMARK OFFICE
CERTIFICATE OF CORRECTION

PATENT NO. : 4,259,359
DATED : March 31, 1981
INVENTOR(S) : Arnold Spicer

It is certified that error appears in the above—identified patent and that said Letters Patent is hereby corrected as shown below:

Column 8, line 37, delete "falvor" insert --flavor--.

Column 10, line 61, delete "double" insert --edible--.

Column 12, line 13, delete "11" insert --1--.

Signed and Sealed this

Eighth Day of September 1981

[SEAL]

Attest:

GERALD J. MOSSINGHOFF

Attesting Officer  Commissioner of Patents and Trademarks

UNITED STATES PATENT AND TRADEMARK OFFICE
CERTIFICATE OF CORRECTION

PATENT NO. : 4,259,359
DATED : March 31, 1981
INVENTOR(S) : Dr. Arnold Spicer

It is certified that error appears in the above—identified patent and that said Letters Patent is hereby corrected as shown below:

Column 5, line 56, delete "than" insert --then--.

Column 11, line 16, delete "said" insert --an--.

Column 11, line 17, delete "an" insert --said--.

Signed and Sealed this

Third Day of August 1982

[SEAL]

Attest:

GERALD J. MOSSINGHOFF

Attesting Officer     Commissioner of Patents and Trademarks